United States Patent [19]
Fishbein et al.

[11] 4,123,755
[45] Oct. 31, 1978

[54] RADAR INTERFERENCE REDUCTION

[76] Inventors: William Fishbein, 283 Norgrove Pl., Elberon, N.J. 07740; Reinhard Olesch, 17 Greenleaf, Englishtown, N.J. 07726; Otto Rittenbach, 17 Jumping Brook Dr., Neptune, N.J. 07753

[21] Appl. No.: 621,261

[22] Filed: Oct. 10, 1975

[51] Int. Cl.² ............................................. G01S 7/28
[52] U.S. Cl. ................................ 343/17.1 R; 325/141
[58] Field of Search ................... 343/17.1 R; 328/142, 328/160; 325/141, 161, 164, 159

[56] References Cited
U.S. PATENT DOCUMENTS

| | | | |
|---|---|---|---|
| 3,022,492 | 2/1962 | Kleist et al. | 343/6.5 SS |
| 3,745,578 | 7/1973 | Barrett, Jr. et al. | 343/17.2 R |
| 3,940,696 | 2/1976 | Nagy | 325/141 |

Primary Examiner—Maynard R. Wilbur
Assistant Examiner—T. M. Blum
Attorney, Agent, or Firm—Nathan Edelberg; Jeremiah G. Murray; Daniel D. Sharp

[57] ABSTRACT

Interference between radar systems is eliminated by using shaped pulses. In one embodiment, the pulse has a cosine shape, in another a $\cos^2$ shape and in a third embodiment a $\cos^n$ shape. In yet another embodiment, a single sideband shaped pulse is employed.

4 Claims, 13 Drawing Figures

FIG. 4 c = SUM OF a AND b

FIG. 12

RADAR INTERFERENCE REDUCTION

GOVERNMENT LICENSE

The invention described herein may be manufactured and used by or for the Government for governmental purposes without the payment of any royalties thereon or therefor.

BACKGROUND OF THE INVENTION (a) Field of the Invention

Broadly speaking, this invention relates to radar. More particularly, in a preferred embodiment, this invention relates to methods and apparatus for generating shaped radar pulses having reduced spectral occupancy.

(b) Discussion of the Prior Art

The conservation of the electromagnetic spectrum is of vital importance, since available frequency bands are critically limited. This shortage is already so serious at the lower radar frequencies that allocations are virtually unavailable for high resolution radar systems. It is, therefore, imperative that spectral space be employed with the greatest possible efficiency. Interference may be experienced by a radar system due to direct reception of emissions from another system (via antenna mainlobes, sidelobes or a combination of each). It may also occur from reflections from targets which were illuminated by the second radar system.

The problem then is to devise methods and apparatus for reducing this interference.

SUMMARY OF THE INVENTION

As a solution to this and other problems, the instant invention contemplates methods and apparatus which reduces interference in several ways: First, by shaping the transmitted waveform which may be either pulse or CW. This reduces interference from spectral sidelobes; and hence, allows greater spectral proximity between two radar systems; secondly, by decreasing the transmitted spectrum by as much as 50 percent through the use of single-sideband techniques.

More specifically, in a radar system of the type wherein a beam of microwave energy interrogates a distant target, the target generating a return echo which is received by the interrogating antenna for subsequent signal processing, the invention comprises means for shaping the pulses comprising the beam so that each pulse assumes a $\cos^n$ shaped spectrum, $n \geq 1$.

The invention, and its mode of operation, will be more fully understood from the following detailed description, when taken with the appended drawings, in which:

DETAILED DESCRIPTION OF THE INVENTION

The usual method for decreasing the width of the radiated spectrum of a pulsed radar system is to shape the envelope of the transmitted pulses by filtering. This is difficult at the radio frequencies typically employed for radar systems using tunable transmitters, or when high power levels are involved. Further, this approch does not offer a solution for continuous wave radar systems. A CW radar system with range resolution is basically similar to ordinary pulse radar because the former waveform can be considered as the sum of multiple pulse waveforms. Both systems use time-coded waveforms which produce echoes that are encoded according to the range wherein they originated. Both have wide frequency spectra, the width depending on the resolution achieved. The term "pulse" is, therefore, generalized herein to include both waveforms. As will be demonstrated, consideration of the on-off waveform provides an insight into the operation of CW radars as well.

The pulse shaping approach disclosed and claimed herein is based on the principle of reducing the first or nearby sidelobes of the spectrum of a rectangular pulse. By the addition of another spectrum, appropriately weighted and displayed in frequency, these sidelobes can be partially cancelled. Although other sidelobes may actually increase in this procedure, it will be shown that this technique reduces rather than increases the spectral occupancy of the resultant signal.

By use of the techniques disclosed herein a more concentrated spectrum is obtained. Thus, by combining ordinary rectangular pulse signals of different but related frequencies and phase, the methods disclosed herein effect a shaping of the spectrum, hence also of the corresponding time pulse. In the frequency domain, this process may be represented as the addition of si-shaped spectra (si $x = (\sin x)/x$) in such a way that the resulting combined spectrum has sidelobes that fall off at a higher rate than those of the spectra of the component pulse signals. In the time domain, the pulse shape corresponding to such a composite spectrum will be, in general, of the form $\cos^n$, its shaping (smoothness) depending on $n$ and thereby on the number of component signals.

Figure 1:
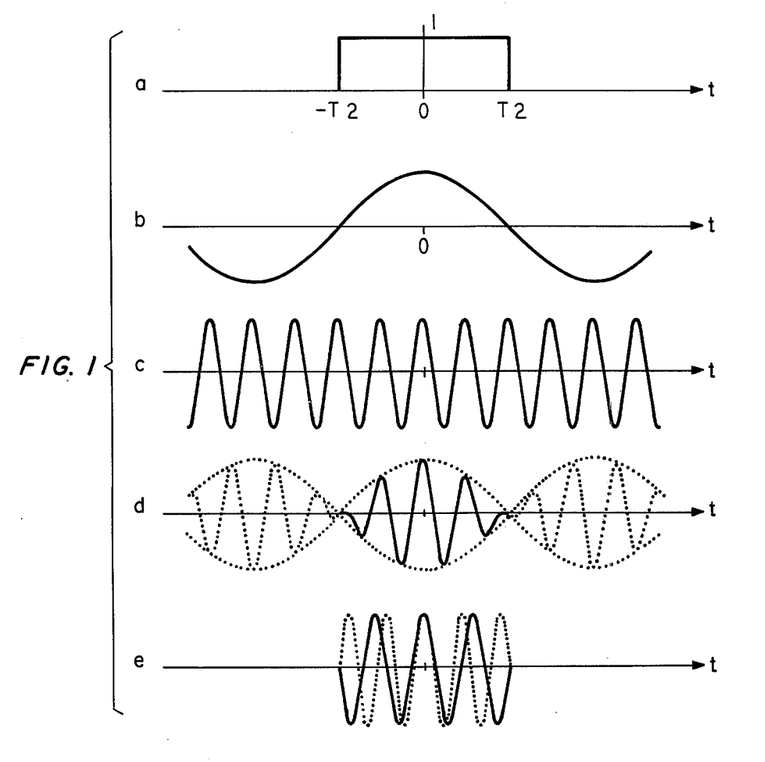
FIG. 1 is a graph depicting the waveform of a rectangular and a shaped pulse according to the invention.

An ordinary rectangular pulse, contained within the switching function S(t), is the simplest member of the family of pulse shapes given by $\cos^n$. In this case $n = 0$ and the rectangular pulse is defined by $\cos^o$. As shown in FIG. 1, assuming the amplitude of the pulse to be unity, its width T and its center at time $t = 0$, the spectrum of the pulse, $F_o(w)$, (subscript corresponding to the order of smoothness) will be given by $$F_o(w) = \int_{-\infty}^{\infty} S(t) \cos^o wt \cos wt\, dt = \frac{2 \sin(wT/2)}{w} = T\, si\, (wT/2) \quad (1)$$

Here $w$ represents the radian frequency. When this pulse modulates an RF carrier, $w_c$, the same spectrum will exist, centered at $w = w_c$. It will be noted that for this spectrum, the sidelobe peaks fall off as $1/w$.

The mutual interference between two radar systems depends on many factors, some of which are their given physical separation and siting, their antenna patterns, power levels, receiver sensitivities, antenna alignment, frequency separation, and occupied bandwidths. A mutual interference function I may be defined for this interference and represents the output of a particular receiver to an input conditioned by these parameters. For a rectangular pulse, I, as a function of the spectral separation, $w_d$, between matched and received signals, may be shown to be:

$$I \approx \frac{\sin(w_d T/2)}{w_d} = (T/2)\, si(w_d T/2) \quad (2)$$

It is apparent that, given a fixed T, for some values of frequency separation (i.e., when $w_d T/2 = k\pi;\ k = 1, 2 \ldots$), the interference approaches 0. However, various instabilities as well as neglected higher order terms and the geometrical relation between the radar system and their targets make a realization of this choice difficult. Hence the "envelope" of this function, $1/w_d$, is considered to be the factor which determines the allowable spectral proximity of two rectangular pulse radar systems. If, for example, it were required that the interference from an adjacent si-shaped spectrum be 48 dB down, it may be shown that a separation of $r \approx 81.5$ phase revolutions is required, where $r = w_d T/2$. Since the spectrum $F_o(w)$, for both of the interfering signals has nulls at $wT = 2k\pi;\ k = 1,2 \ldots$, this value of $r$ requires that the two spectra be separated by approximately 81.5 sidelobes. In particular, for a 1 μs rectangular pulse, 81.5 MHz separation is required to assure that the interference will be below −48 dB.

The first order of improvement over the rectangular pulse is the cosine pulse. By removing the discontinuities of the waveform, a reduction in the sidelobe level, hence the spectral occupancy of the signal, is achieved. If pulse shaping by means of filters is to be avoided, the cosine pulse must be produced by appropriate modulation, as shown in FIG. 1. The RF carrier, FIG. 1c, is balanced modulated by the shaping function of FIG. 1b and gated by $S(t)$ (FIG. 1a) to form a pulse train. The resulting pulse, the solid line in FIG. 1d, has the desired cosine envelope.

In order to analyze this pulse it is noted that the modulation of the carrier by the shaping function results in two frequency components. Letting the carrier $f_c(t) = \cos w_c t$ and the shaping function $f_s(t) = \cos(\pi t/T)$, the cosine pulse $f_1(t)$ is given by:

$$f_1(t) = S(t) f_s(t) f_c(t) = S(t) \cos(\pi t/T)$$
$$\cos(w_c t) = \tfrac{1}{2}(\cos(w_c + \pi/T)t + \cos(w_c - \pi/T)t) S(t) \quad (3)$$

The cosine shaped RF pulse is thus seen to be the sum of two separate signals, one below and one above the carrier frequency. These signals differ in frequency by $w_a = 2\pi/T$ and are shown in FIG. 1e.

The phase relationship of these two signals is important and must be as shown in FIG. 1e. If one signal is considered to be a new carrier, the second represents the same signal linearly phase-shifted by $2\pi$ radians during the pulse duration T. This relationship gives rise to a modulating technique which is also applicable to CW radar, as will be discussed below.

Figure 2:
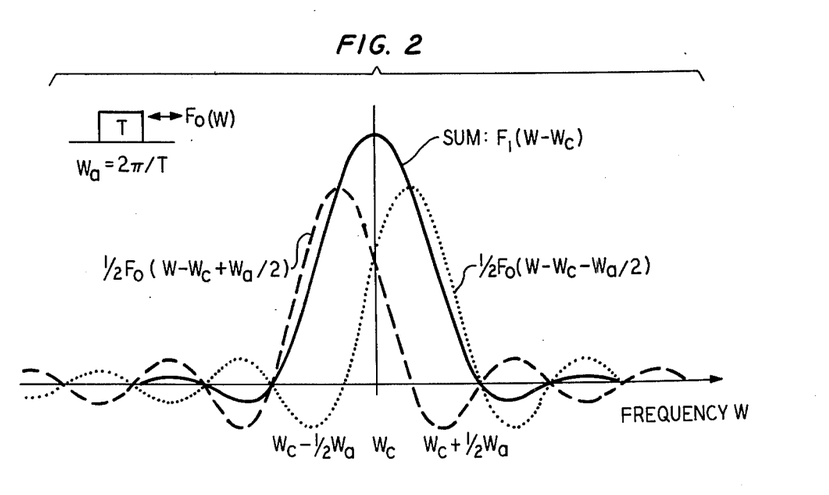
FIG. 2 is a graph depicting the component waveforms of a shaped cosine pulse according to the invention.

The addition of two rectangular RF pulses corresponds to the sum of two si-shaped spectra in the frequency domain. FIG. 2 shows the spectra associated with the signals of FIG. 1e, namely $$\tfrac{1}{2} F_o[w - w_c - (w_a/2)]$$

and their sum $F_1(w - w_c)$, the spectrum of the cosine pulse, FIG. 1d.

From the definitions of $F_o(w)$ and $w_a$, $F_1(w)$ can be expressed as $$F_1(w) = \tfrac{1}{2} \left[ \frac{1}{w + w_a/2} - \frac{1}{w - w_a/2} \right] \cos \frac{wT}{2} \quad (4)$$

which is the baseband spectrum of the cosine pulse.

FIG. 2 alludes to the general procedure of spectral sidelobe reduction through pulse shaping. In particular, according to the principles of this invention the component spectra are placed symmetrically about $w_c$ so that the center of one spectrum is aligned with the first null of the other. The result is a partial cancellation of the first sidelobe by the mainlobe skirt of the second spectrum. Also, the maxima of the other sidelobes are aligned with those of the second spectrum so as to oppose each other. The sum of the two spectra has, therefore, significantly reduced sidelobes as they represent the difference between the sidelobes of the individual spectra. The sidelobe improvement of the cosine pulse spectrum $F_1$ over that of $F_o$ is apparent if the component spectra of $F_1$ are centered about $w = w_a/2$, i.e., when $F_1(w + w_a/2)$ is formed. The frequency shifted $F_1$ is given by $$F_1(w + w_a/2 = \tfrac{1}{2}[F_o(w) + F_o(w + w_a)] = \frac{w_a}{2(w + w_a)} F_o(w) \quad (5)$$

This form of $F_1$ shows an $F_o$ modified by an additional pole. As was apparent from $F_1(w)$, the spectral sidelobes of the cosine pulse decay almost as $1/w^2$.

Figure 3:
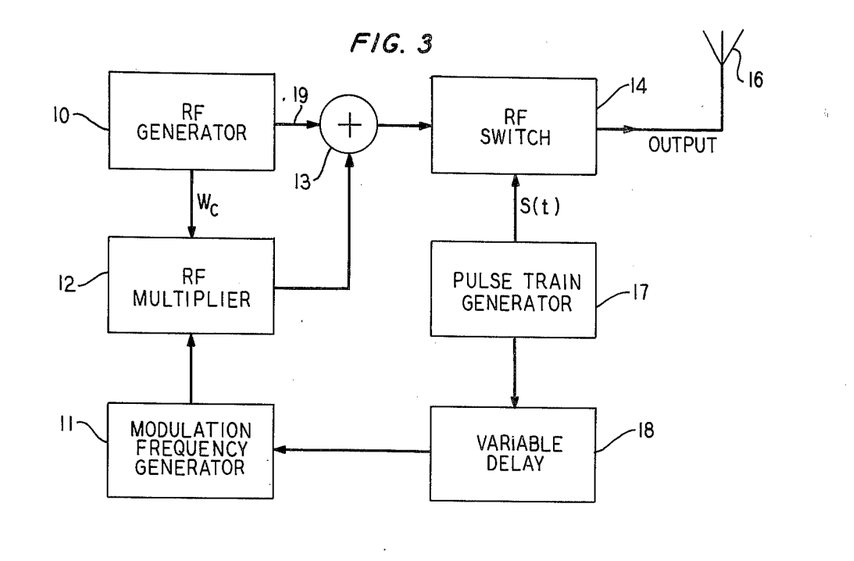
FIG. 3 is a block schematic diagram of an illustrative radar system employing a shaped cosine pulse according to the invention.

FIG. 3 depicts an illustrative apparatus which may be used to generate the cosine shaped pulse shown in FIG. 1d. As shown, an RF generator 10 and a modulation frequency generator 11 both feed the inputs of an RF multiplier 12. The output of multiplier 12 is connected, via an adder 13 to an RF switch 14 thence to an antenna 16. A pulse train generator 17 is connected to the gating input of RF switch 14 and, via an adjustable delay circuit 18, to modulation frequency generator 11 to synchronize the same. The connection 19 between RF generator 10 and adder 13 is not used in this embodiment.

In operation, the modulation frequency $w_a/2$ from generator 11 is mixed with the carrier $w_c$ from generator 10 in multiplier 12. The resulting product is then gated by $S(t)$, which is accomplished by pulse train generator 17 and RF switch 14. The variable delay 18 serves to adjust the gating time so as to insure the proper synchronism with the shaping function $\cos(w_a t/2)$. The pulse width must also be adjustable to allow a match between the nulls of the modulation result and the end of the gate. To evaluate any advantage in spectral occupancy of the cosine shaped pulse, the interference criterion is employed again. It can be shown that the interference between radar systems using cosine pulse, I, is given by $$I = \left[ \frac{2}{w_d} - \frac{1}{w_d + w_a} - \frac{1}{w_d - w_a} \right] \frac{\sin(w_d T/2)}{4} \quad (6)$$

which falls off approximately as the third power of frequency separation, rather than the first as was the case for the rectangular pulse.

Using the previous level of −48 dB maximum permissible interference, it is seen that the spectral proximity, r, for two such signals is only $r \approx 4.4$ i.e., they may be as near as 4.4 sidelobes' width to each other. This is a significant improvement over the previous requirement of 81.5 sidelobes for the case of the si-shaped spectrum. In other words, for a 1 μs pulse only about 4.4 MHz separation between pulses is required.

Let us now consider $\cos^2$-shaped pulses. To form this pulse in an analogous manner, three si-shaped spectra, displaced from one another by the spectral distance $w_a = 2\pi/T$, are summed. A choice of component signals $\cos w_c t$, $\cos(w_c + w_a)t$, and $\cos(w_c - w_a)t$ appears logical. However, according to the invention the latter two signals are now weighted by a factor ½ relative to the center frequency. This weighting arises from the requirements of symmetry of the sum spectrum and the fact that higher order sidelobes require smaller signals for cancellation. The baseband spectrum $F_2(w)$ is given by $$F_2(w) = (\tfrac{1}{4})F_o(w - w_a) + (\tfrac{1}{2})F_o(w) + (\tfrac{1}{4})F_o(w + w_a) = \quad (7)$$

$$\tfrac{1}{2}(\sin(wT/2)) \left[ + \frac{2}{w} - \frac{1}{(w - w_a)} - \frac{1}{(w + w_a)} \right]$$

From Equation (7) it can be seen that the addition of an additional si-spectrum adds one pole to the expression for the spectrum. The sidelobes of $F_2(w)$ thus fall off about as $1/w^3$, which is an even more desirable behavior from the standpoint of spectral occupancy. The center of $F_2(w)$ is located at $w = 0$ (at the carrier $w = w_c$ for the modulated signal), or again at the mean of center frequencies of the component spectra.

In the time domain, this process may be considered a summation of three carriers, modulated by rectangular pulses. The resultant pulse shape, $f_2(t)$, is $$f_2(t) = \tfrac{1}{4}S(t)\cos w_c t + (\tfrac{1}{2})S(t)\cos(w + w_a)t + (\tfrac{1}{4})S(t)\cos(w - w_a)t = S(t)\cos w_c t \cos^2(w_a t/2) \quad (8)$$

That is, a $\cos^2$-shaped envelope on a carrier frequency of $w_c$. Consistent with the improved behavior of its spectrum, this signal has an envelope of one degree smoother than the cosine pulse.

The measure of spectral occupancy, I, is again applied and can be shown to be $$I = \left[ \frac{1}{w_d - 2w_a} - \frac{4}{w_d - w_a} + \frac{6}{w_d} - \frac{4}{w_d + w_a} + \frac{1}{w_d + 2w_a} \right] \frac{\sin(w_d T/2)}{16} \quad (9)$$

which decays approximately as the fifth power of spectral separation. As defined previously, r is now $\approx 3.5$ which indicates a further saving in spectral occupancy. The improvement over the cosine pulse shape is diminishing, however, since for small values of r, the increasing mainlobe widths of the spectra are dominant. The advantage of higher order pulse shapes becomes apparent, however, when greater interference attenuation is required.

The apparatus shown in FIG. 3 can also be used to generate the $\cos^2$ pulse. In this case, the optional connection 19 between RF generator 10 and adder 13 is used.

Figure 4:
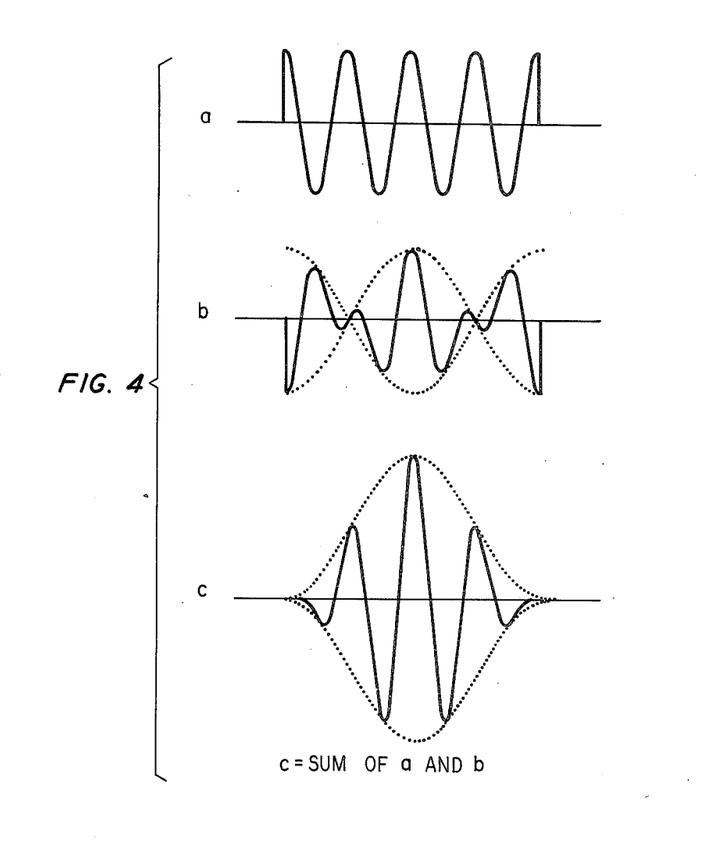
FIG. 4 is a graph depicting the component waveforms of a $\cos^2$ shaped pulse according to the invention.

In operation, and with reference to FIG. 4 as well as FIG. 3, modulation frequency generator 11 now produces $\cos w_a t$ and the output of multiplier 12 is $\cos(w_c + w_a)t$ and $\cos(w_c - w_a)t$, as shown in FIG. 4b. This signal is combined with the carrier $\cos w_c t$ (FIG. 4a) and gated as before. FIG. 4c shows the output. The previous requirements for phase relationship between component signals and weighting still hold and S(t) must be properly synchronized via delay circuit 18.

As the process of combining rectangular RF pulses, properly related in amplitude, phase and frequency, is expanded, higher orders of smoothness of the time function, accompanied by corresponding sidelobe reduction, is obtained. General requirements and properties of the $\cos^n$ shaped RF pulse are obtained by expanding the expression for the baseband pulse.

It can be shown that the expression is given by $$f_n(t) = S(t) \cos^n(w_a T/2) = 1/2^n \sum_{p=0}^{n} \binom{n}{p} \cos(p - n/2)w_a t \quad (10)$$

where $$\binom{n}{p}$$

are the binomial coefficients. This expression shows that the $\cos^n$ shaped RF pulse is composed of $n + 1$ rectangular RF pulses, all in phase at $t = 0$ and having frequencies that differ by $w_a = 2\pi/T$. Their relative weights are given by the binomial coefficients associated with n and the normalization factor is the sum of the coefficients of $2^n$.

In the frequency domain these $n + 1$ components result in the $n + 1$ si-shaped spectra similarly weighted and spaced at intervals of $w_a$ symmetrically located about the carrier. In terms of baseband spectra:

$$F_n(w) = \left(\frac{1}{2}\right)^n \sum_{p=}^{n} \binom{n}{p} F_o[w - (p - n/2)w_a] \quad (11)$$

The center of the sum spectrum $F_n(w - w_c)$ will lie at $w_c$ or, in general, at the mean of the component frequencies. For even $n$ an odd number of components exist at $w_c$, $w_c \pm w_a$, $w_c \pm 2w_a$, etc. The spectrum will be of the form $(\sin x)_x^{n+1}$ for large $w$. For odd $n$ the $n + 1$ components lie at $w_c \pm w_a/2$, $w_c \pm 3w_a/2$, $w_c \pm 5w_a/2$, etc. and the spectrum $F_n$ will be of the form $(\cos x)/_x^{n+1}$ for large $w$. It should be noted that for odd $n$ the spectrum may be shifted by $w_a/2$ so that $F_n(w - w_a/2)$ will also be of the form $(\sin x)/x^{n+1}$ for large $w$.

It is noted that each additional component spectrum adds one order of smoothness to the resultant pulse by adding one pole to the expression for the spectrum. At the same time, one null is removed from the spectrum. However, while the sidelobes are cancelled more strongly, the main lobe widens by $w_a/2$ with each additional component spectrum. Effectively, the power of the signal is concentrated near the spectral center at the expense of sidelobe power. Thus, while the bandwidth, as measured by the nulls bracketing the main lobe, is actually widened, the effective width of the spectrum (rms bandwidth) is decreased in the limit as $n \to \infty$, the sidelobes vanish completely, and a gaussian spectrum remains.

Assuming that the signal and receiver are matched, except for the center frequency, it can be shown that I, the interference function, is of a form similar to that of $F_{2n}(w)$. It appears that for any one interference level assumed it is not efficient to increase $n$ indefinitely since $r$ diminishes only slightly after a certain $n$ is reached. By the use of I, calculated for design signals and receiver (and other radar parameters) together with a specified maximum interference level, a trade-off of $r$ versus pulse shaping $n$ must be conducted for each specific design.

Figure 5:
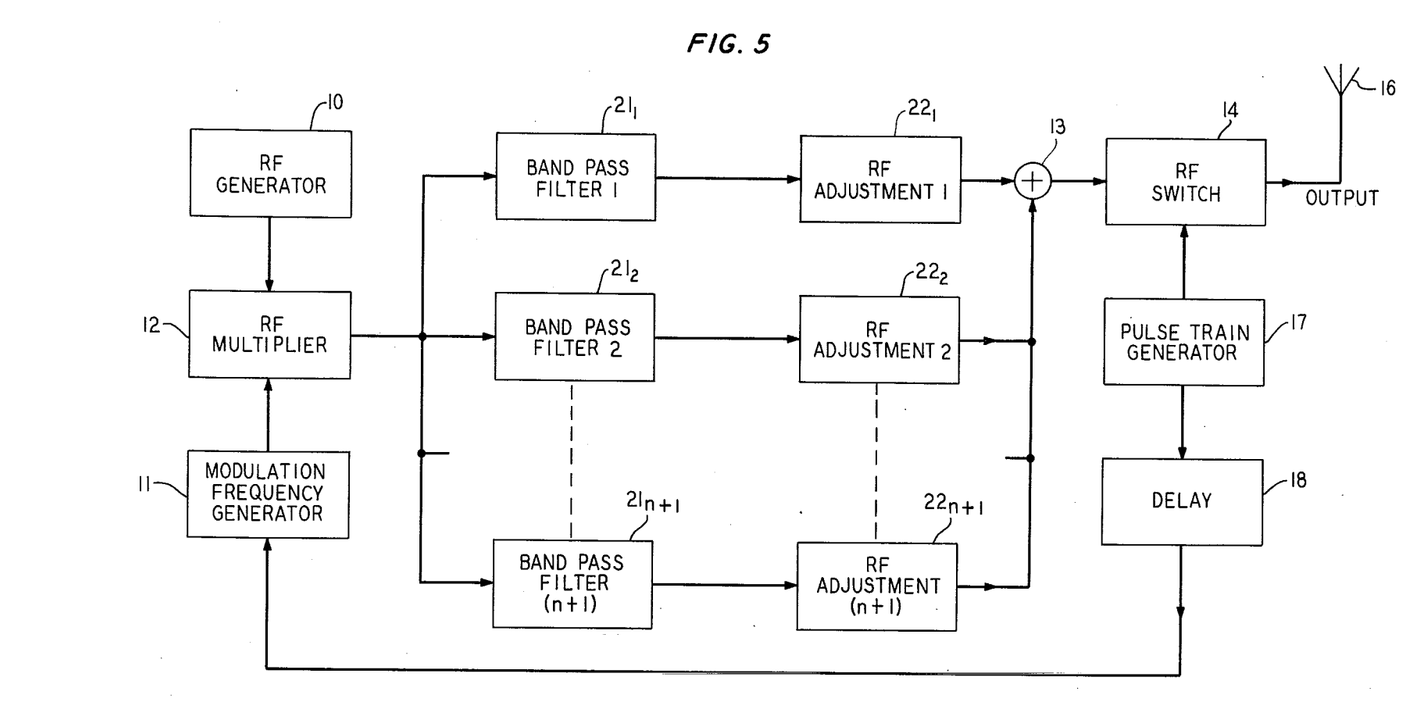
FIG. 5 is a block schematic diagram of an illustrative radar system employing a $\cos^n$ shaped pulse according to the invention.

FIG. 5 depicts a modification of the circuitry shown in FIG. 3 which, according to the invention, may be used to generated $\cos^n$ shaped RF pulses. As shown, a bandpass filter 21 and an amplitude and phase adjusting circuit 22 are connected between the output of multiplier 12 and adder 13. Actually, $(n + 1)$ such circuits are provided, the actual number depending on the value of $n$ in $\cos^n$.

In operation, multiplier 12 produces many harmonics between the RF carrier signal and the modulator signal. The RF bandpass filters 21 select the desired harmonics, passing odd multiples if the modulation frequency is $w_a/2$ and all multiples if it is $w_a$ ($n$ odd or even respectively). These components are then adjusted in amplitude (weighting) and phase (linearity) and summed. The gating pulse generator is again made adjustable in respect to the pulse length and starting time in adjustment circuits 22 to assure gating the appropriate segment of the modulation product.

Instead of summing $n + 1$ weighted rectangular pulses (si-spectra) to form a $\cos^n$ pulse, it should be noted that, alternately, two unity weighted but previously shaped waveforms may be combined to form a resultant shape of greater smoothness. This arises from the fact that any series of bimonial coefficients, $$\binom{n}{p},$$

can be obtained by adding two of the preceding series $$\binom{n-1}{p}$$

displaced by one element. The following example illustrates this (at baseband), showing how a signal may be "built" up from other shaped pulses.

| Component center frequency: | $-2w_a$ | $-w_a$ | 0 | $w_a$ | $2w_a$ | $3w_a$ |
|---|---|---|---|---|---|---|
| $\cos^4$ Components of weight: | 1 | 4 | 6 | 4 | 1 | |
| $\cos^4$ Components of weight: | | 1 | 4 | 6 | 4 | 1 |
| $\cos^5$ Resultant Components: | 1 | 5 | 10 | 10 | 5 | 1 |

Spectral sidelobe level is often used as a measure of interference or quality of spectral shape. For the $\cos^n$ family of pulse shapes this is not necessary since sidelobes decrease monotonically with increasing frequency and $n$. The parameter $n$ describes the signal completely. It is possible, however, to obtain various sidelobe behaviors by varying either weights or center frequencies (or both) of component spectra. By selection of other than binomial weights and spacing of $w_a$ selected sidelobes may be cancelled to various degrees. In this case $n$ does not describe the signal completely since this technique redistributes signal power to the outer sidelobes which generally increase. This method of pulse shaping may have merit in certain cases, especially when only the maximum sidelobe level is specified.

The concept of pulse shaping above defined with reference to pulsed radar systems also applies to CW radars with range resolution. Although less obvious, a "pulse" shape can usually be defined in the time domain. The basic similarity of radars with range resolution is best observed in their power spectrum and autocorrelation function of the modulating waveform which can be the same for both radar types. An example of a CW radar, having a rectangular "pulse" shape employs phase reversal modulation and a binary, pseudo-random code as modulating function. A single carrier frequency is transmitted whose phase is switched by $\pi$ radians (phase reversed) corresponding to a change in the state of the code. This process is equivalent to a direct multiplication of the carrier by the numerical value ($+1$ or $-1$) of the code at any instant in time, hence represents a modulation of the carrier by the rectangular pulses that constitute the code. The spectrum for this radar, using a 15-element code, is shown as the dotted curve in FIG. 6. It clearly has the si envelope associated with a rectangular pulse.

Figure 6:
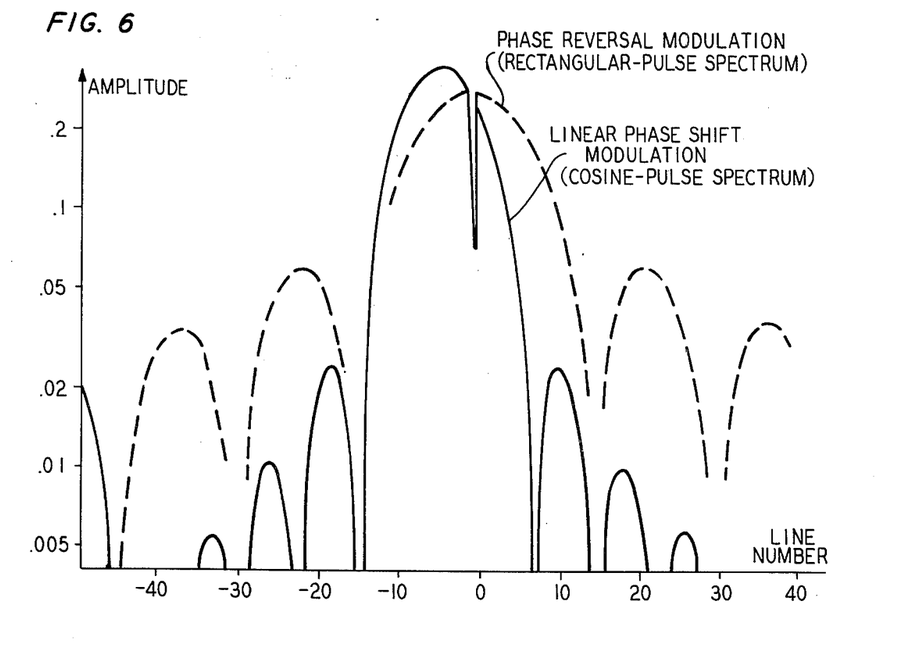
FIG. 6 is a graph depicting the spectrum of two modulated CW pulses.

FIG. 6 also shows in the solid curve the spectrum for another CW radar which exhibits the shape and the sidelobe behavior of the spectrum for a cosine pulse. This effective pulse shape was achieved by the use of two RF frequencies in the modulation process of the CW radar and is thus consistent with the previously derived criteria for pulse shaping. A binary, pseudo-random code was again employed as modulating function. The transmitted signal consisted of the carrier frequency for all time during which the code takes on the first value. The carrier is linearly phase-shifted when the code assumes the second value. For this particular radar, a 15-element code was used; the linear phase shift as π radians over the interval of one code element. A phase shift of π was chosen because of the structure of this particular modulating function for which a 2π phase shift would result in a strong predominance of the carrier. A shift of π rather than 2π results in a distribution of the power among the sidebands rather than in the carrier. As FIG. 6 indicates, the carrier is considerably lower than the envelope of the spectrum and would completely vanish if the binary values were evenly distributed among the code elements. It should also be noted that the spectrum is asymmetric with respect to the carrier. Most important, however, the $1/w^2$ behavior of the sidelobes, typical of the cosine pulse, is in evidence.

Let us now consider the generation of single sideband and skewed sidebands. Ordinary amplitude and frequency modulation produce symmetric pairs of sidebands which, by their symmetry, can be considered redundant. Single sideband operation which transmits all information by means of one sideband only, has long been of great value in communication to reduce spectral occupancy. It may also find application for this purpose in radar. However, here the techniques must be somewhat modified since radar requires that for each resolved target the phase of the carrier be available as well as the sidebands' phases in relation to it. If one sideband only (without carrier) were received and demodulated with a carrier of arbitrary phase, then the modulation function thus recovered would be shifted in phase by an arbitrary amount also. Assuming a carrier $\cos w_c t$ with phase $\phi_c$ and a modulation function $\cos w_m t$, the resulting sidebands would be:

$$\cos(w_c t + \phi_c) \cos w_m t = \tfrac{1}{2} \cos(w_c t + w_m t + \phi_c) + \tfrac{1}{2} \cos(w_c t - w_m t + \phi_c) \quad (12)$$

Demodulation of either sidebands alone by a carrier of arbitrary phase $\theta$ yields:

$$\cos(w_c t \pm w_m t + \phi_c) \cos(w_c t + \theta) = \tfrac{1}{2} \cos(2 w_c t \pm w_m t + \phi_c + \theta) + \tfrac{1}{2} \cos(\pm w_m t + \phi_c - \theta) \quad (13)$$

Figure 7:
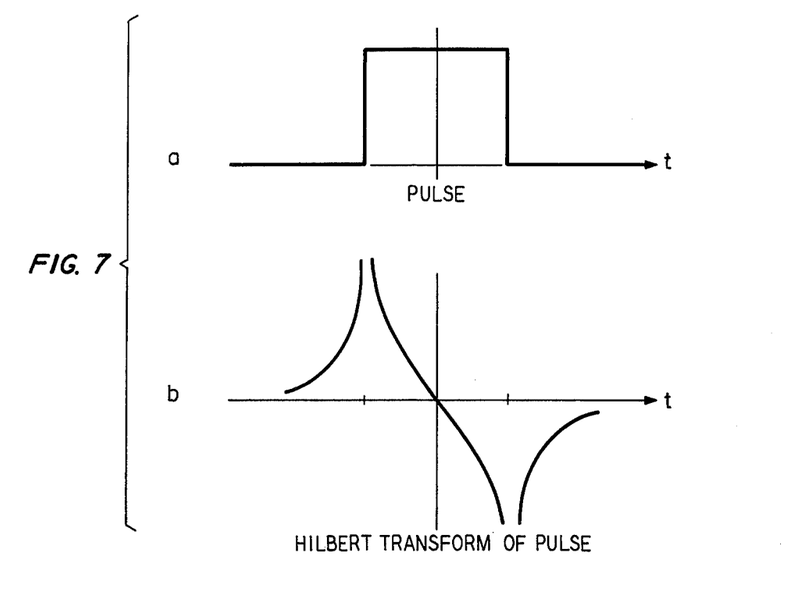
FIG. 7 is a graph depicting a rectangular pulse and the Hilbert transform therefor.

The first term of the result is usually filtered out. The second term contains the information which is sought. It can be seen that the phase $\theta$ of the demodulation reference must be the same as that of the carrier if an undistorted modulation signal is to be recovered. FIG. 7 illustrates a rectangular pulse-modulating function, distorted by a $\pi/2$ radian phase shift, i.e., its Hilbert transform. For other phase shifts, the zero-crossing would generally be displaced from the center but the distortion can still be significant. It is apparent that phase distortion of the recovered modulating function would seriously degrade the resolution of the radar or exceed dynamic ranges. Ideally, then, transmitting the carrier for phase reference and one sideband, completely preserved, would meet the requirements of radar operation.

Figure 8:
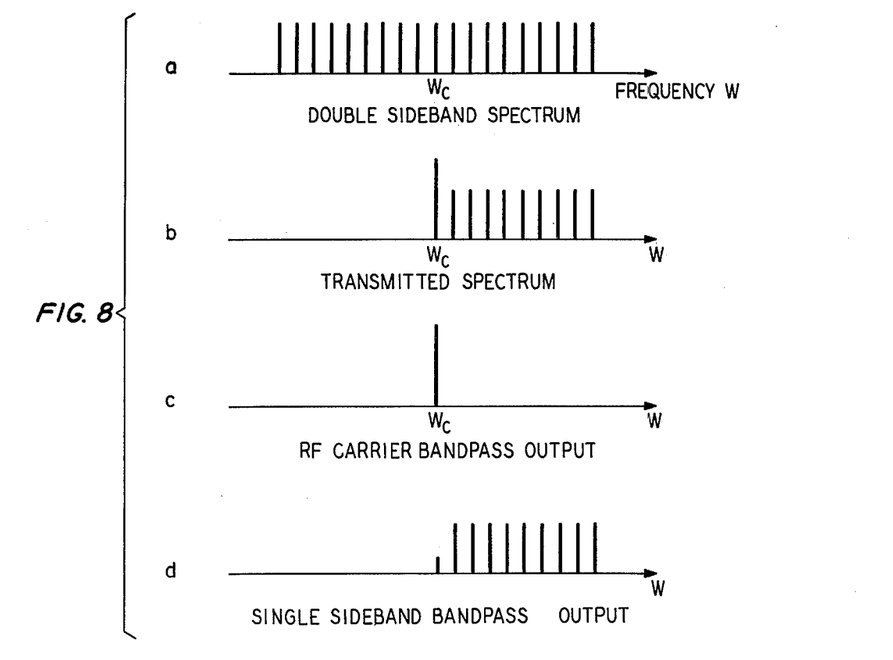
FIG. 8 is a graph depicting the spectrum of a single-sideband pulse signal.

We shall now discuss several hardware configurations to accomplish the above objectives. For a continuous spectrum, the ideal case of deleting one entire sideband would require an infinitely sharp cut-off filter but would result in the saving of 50 percent of the spectral occupancy. For the case of a discrete radar spectrum, this maximum saving can be approached very closely by employing a filter, sharp enough to cut off below the first PRF line of the spectrum. FIGS. 8a and 8b show this condition for a simplified spectrum.

Figure 9:
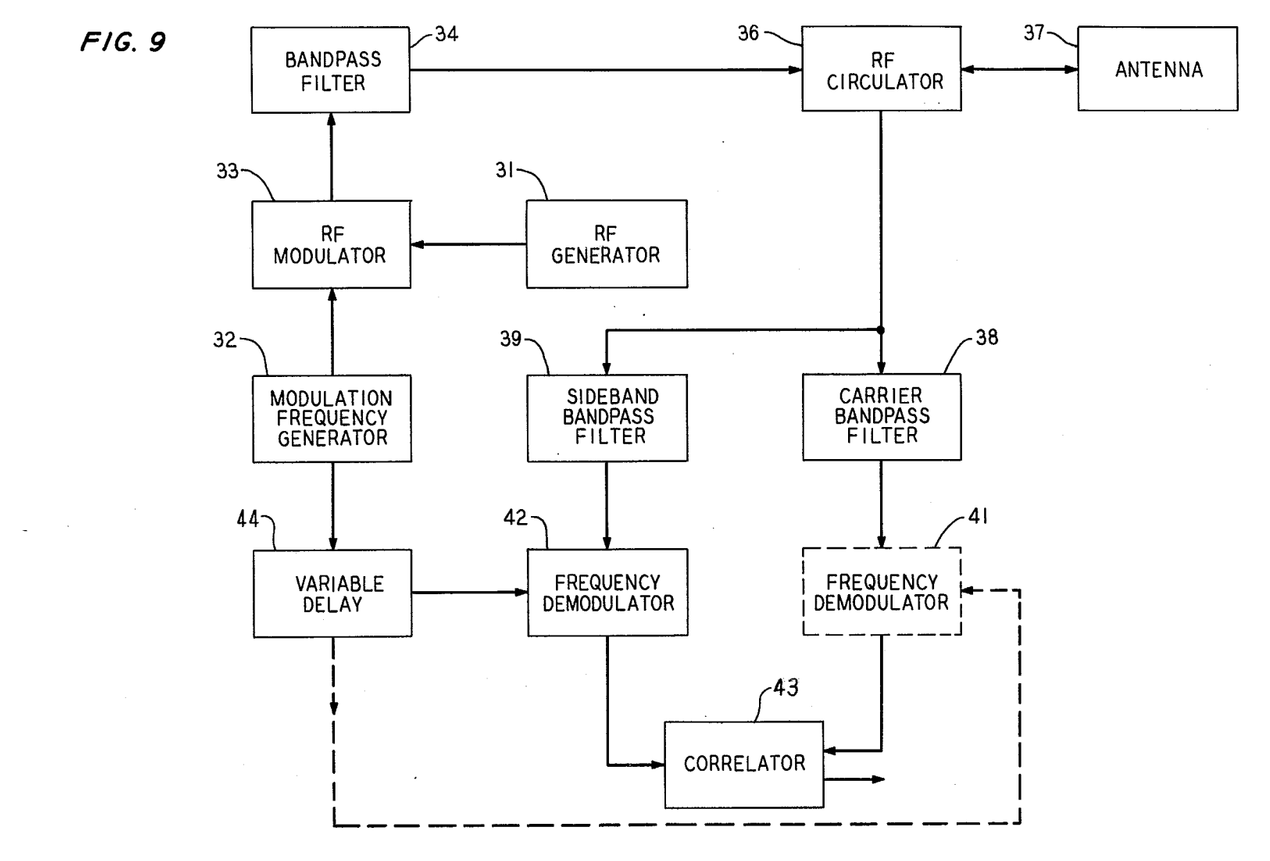
FIG. 9 is a block schematic diagram of an illustrative radar system employing the single-sideband signal shown in FIG. 8.

FIG. 9 depicts an illustrative embodiment of the invention which may be used to generate the signal shown in FIG. 8b. As shown, the output of an RF generator 31 and a modulator frequency generator 32 are combined in an RF modulator 33. The output of modulator 33 is connected to a first bandpass filter 34 thence, via RF circulator 36, to an antenna 37. The circulator 36 is also connected to a carrier bandpass filter 38 and a sideband bandpass filter 39 thence, respectively, to a first demodulator 41 and a second demodulator 42. The outputs of the demodulators are connected to a correlator circuit 43. The output of generator 32 is also connected, via a delay circuit 44, to demodulators 41 and 42.

In operation, combining the output of the RF and modulation frequency generators 31 and 32, the RF modulator 33 produces an ordinary double-sideband modulated RF signal. Assuming that the modulation frequency is the ordinary pulse train, a line spectrum results. Bandpass filter 34, having the properties described above, removes one sideband and sends the single sideband signal and carrier (FIG. 8b) to the antenna 37 via the circulator 36. On reception, the signal enters two channels in which the carrier and sideband are separated. The sideband channel, containing the target range information, is then range-gated by the modulation frequency demodulator 42 and correlated with the demodulated carrier which provides the phase reference for detection. Maximum efficiency is achieved if the power is divided evenly between carrier and sideband.

It must be noted that the single-sideband bandpass filters 34 and 39 perform most critical operations. Not only must the cut-off of the undesired sideband be very sharp, but the filters must accomplish the necessary phase compensation to produce constant delay for all frequencies of the received sideband. This phase compensation may be distributed between the transmitter and receiver. However, it is important that any phase-shift produced peaks do not exceed the dynamic range of the various subsystems, especially the high power transmitter stages.

Figure 10:
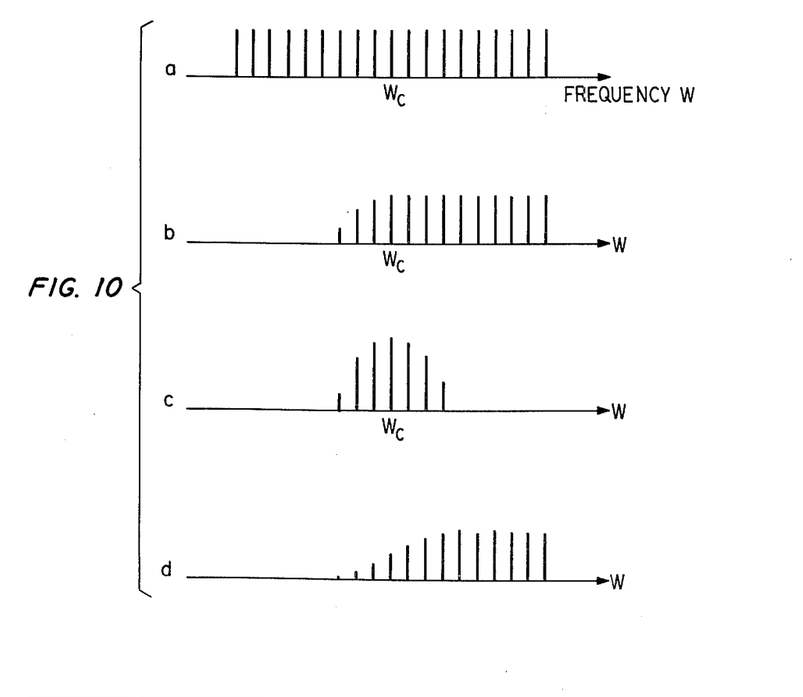
FIG. 10 is a graph depicting the spectrum of a modified single-sideband signal according to the invention.

An alternate embodiment of the invention may be used to generate a narrow spectrum similar to that of a single-sideband signal. This embodiment is similar to the above except that gradual cut-off filtering (Nyquist filtering) is employed during transmission and reception. FIG. 10 shows a simplified spectrum and the operations which are performed on it by this embodiment of the invention.

The block diagram of FIG. 9 again illustrates the process. The single-sideband bandpass filter 34 now comprises a filter which removes one sideband, but does so incompletely, as shown in FIG. 10b. The carrier and sideband filters in the receiver having similar, gradual, cut-off characteristics so that the signals entering the two channels of the receiver are as shown in FIGS. 10c and 10d. The processing of the signals is otherwise the same as previously described, except that now demodulator 41 is added to provide course range resolution. Also, the same requirements of phase linearity and phase relation between carrier and sideband signals are again imposed on this filter.

Nyquist filtering, although it results in less bandwidth saving than the previous scheme, is mentioned here because it is a feasible technique. It is commonly employed in television transmission and can be implemented for radars of similar frequency. A single-sideband radar differs only in the added carrier channel which is needed as a range reference during reception. In the example shown in FIG. 10, the distribution of power between carrier and sideband channels of the receiver is not equal, as required for best correlation. Practical constraints on filters will often cause such a condition. However, even a distribution such as shown would still result in acceptable correlation. The saving of spectral occupancy is always below the maximum 50 percent and depends on the roll-off of the sideband filter.

An alternate RF modulation and single-sideband generation scheme may be employed. In principle it consists of two channels in which quadrature RF signals are mixed with quadrature modulation functions respectively. The sum of these two products will be a signal with one of the sidebands cancelled.

Figure 11:
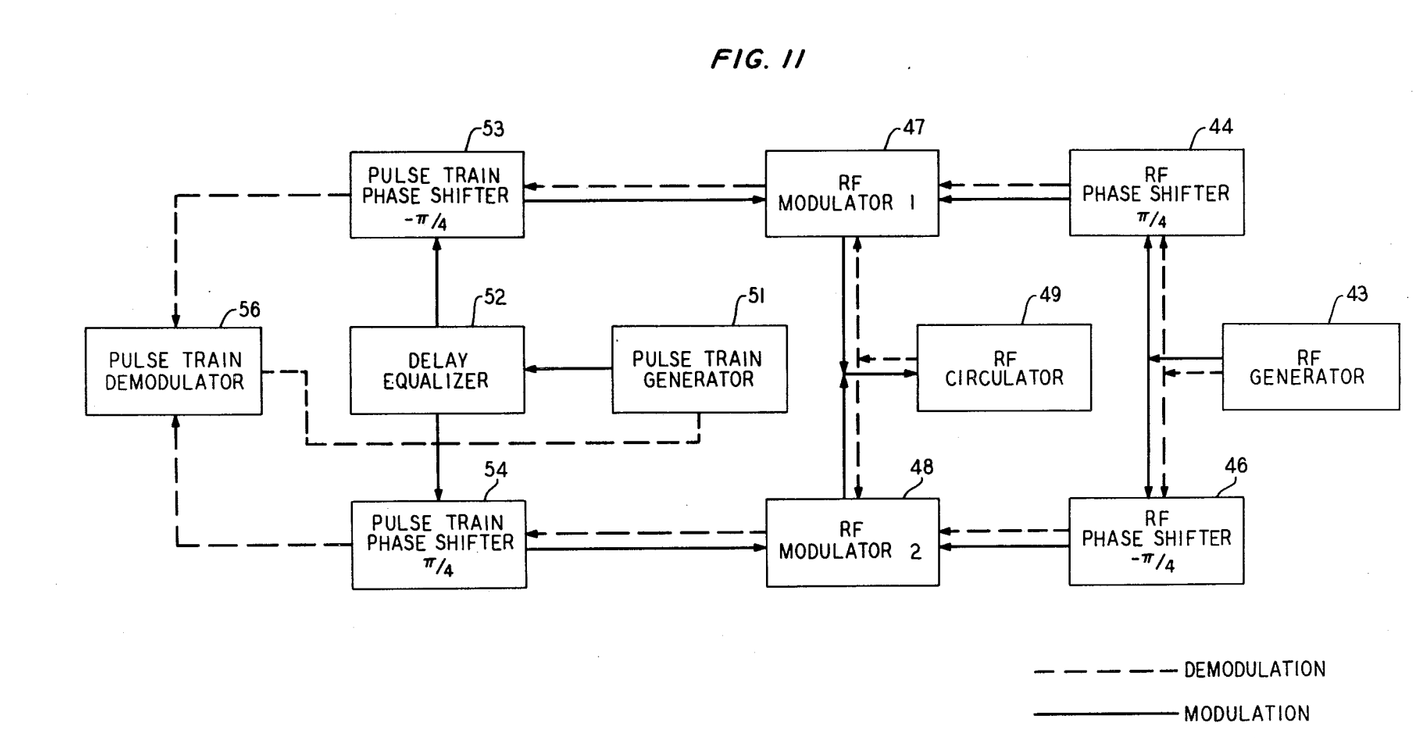
FIG. 11 is a block schematic diagram of an alternate radar system also employing single-sideband modulation.

FIG. 11 illustrates this method, slightly modified for a more practical implementation. As shown, the output of an RF generator 43 is connected to first and second phase shifter circuits 44 and 46, thence to first and second r.f. modulators 47 and 48. The output of both Rf modulators is connected to an RF circulator 49, thence to an antenna (not shown). A pulse train generator 51 is connected, via a delay equalizer 52, to third and fourth phase shifter circuits 53 and 54 thence, respectively, to modulators 47 and 48. The outputs of phase shifters 53 and 54 are also connected to a demodulator 56.

In operation, the modulating function can be the rectangular pulse commonly used in radar. To derive the required quadrature signals two sets of phase shifting operations are performed in phase shifters 44 and 46, resulting in two shifts of $+\pi/4$ and $-\pi/4$ radians rather than one shift of $\pi/2$. The RF carrier and modulation are thus processed in phase shiters 44, 46 and 53, 54. The upper and lower channels will, therefore, be in quadrature as required. For sinusoidal modulation the result is as follows:

$$\cos(w_c t + \pi/4)\cos(w_m t - \pi/4) = (\tfrac{1}{2})\cos(w_c t + w_m t) + (\tfrac{1}{2})\cos(w_c t - w_m t + \pi/2) \quad (14)$$

$$\cos(w_c t - \pi/4)\cos(w_m t + \pi/4) = (\tfrac{1}{2})\cos(w_c t + w_m t) - (\tfrac{1}{2})\cos(w_c t - w_m t - \pi/2) \quad (15)$$

The sum of these terms, i.e., the signal into circulator 49, is $\cos(w_c - w_m)t$.

The example of a pulse radar given here requires that a rectangular pulse be phase shifted by $a + \pi/4$ radians. This is not a simple matter, since the pulse contains a wide band of frequencies, all of which must be shifted the same constant amount. Also, waveforms as illustrated by FIG. 7 must be avoided. Further, during reception the Doppler shift of the echo requires again that all frequencies rather than a signal frequency be phase shifted. A practical implementation of such a phase shifter applies phase shift functions $\phi_1(w)$ and $\phi_2(w)$ to the modulation signal rather than discrete shifts of $-\pi/4$ and $\pi/4$. Here $\phi_2(w) - \phi_1(s) \approx \pi/2$ over the frequency range of interest. When this substitution is made in the above equations, the difference terms will cancel upon addition as before. The sum terms are again equal but will add to $\cos(w_c t + w_m t + \phi_1 + \pi/4)$. A delay equalizer 52 is, therefore, shown in FIG. 11 to remove the distorting effect of this residual phase shift as well as any others that may have been incurred elsewhere. This is accomplished by adding a frequency dependent phase correction so that in the resulting signal the combined phase term is proportional to frequency, i.e., that all frequencies are delayed by an equal amount. For simplicity, the carrier, inserted for transmission, is not shown, although required for the radar case.

On reception, the converse of this operation takes place. Ordinary demodulation could be employed if the transmitted signal were the only one received. However, single-sideband demodulation is used here to reject any signals in the unused sideband. The two demodulations produce (in multipliers 47 and 48 of FIG. 11 respectively):

$$\operatorname{co}(w_c \pm w_m)t \cos(w_c t + \pi/4) = \tfrac{1}{2}\cos(2w_c t \pm w_m t + \pi/4) + \tfrac{1}{2}\cos(w_m t - \pi/4) \quad (16)$$

$$\cos(w_c \pm w_m)t \cos(w_c t - \pi/4) = \tfrac{1}{2}\cos(2w_c t + w_m t - \pi/4) + \tfrac{1}{2}\cos(w_m t \pm \pi/4) \quad (17)$$

The upper and lower signs represent processing for upper and lower sideband respectively. Terms contining $2w_c t$ are filtered out, leaving the modulation function, but shifted in phase.

If processing for the upper sideband is desired, the resultant signals will be phased shifted $\pi/4$ and $-\pi/4$ respectively and added. In that case it is seen that the demodulation result of the upper-sideband processing yields $\cos w_m t$ while those of the lower sideband cancel. Processing for the lower sideband requires opposite phase shifts prior to summing.

From the above-discussed Nyquist filter technique, which employs a narrow and relatively strong carrier "band" along with a wider sideband, an analogous scheme was derived in which two otherwise independent radar signals perform the functions of the carrier and sideband channels. The first such channel is high power but narrowband, thus providing only coarse range resolution. The second, a lower power signal, contributes the required fine resolution at corresponding greater bandwidth. Upon separate demodulation and processing of these two channels, they are again combined in a correlation process as for the previous single-sideband schemes. Analogously, the narrow band channel serves as a reference for the lower power high resolution signal.

Figure 12:
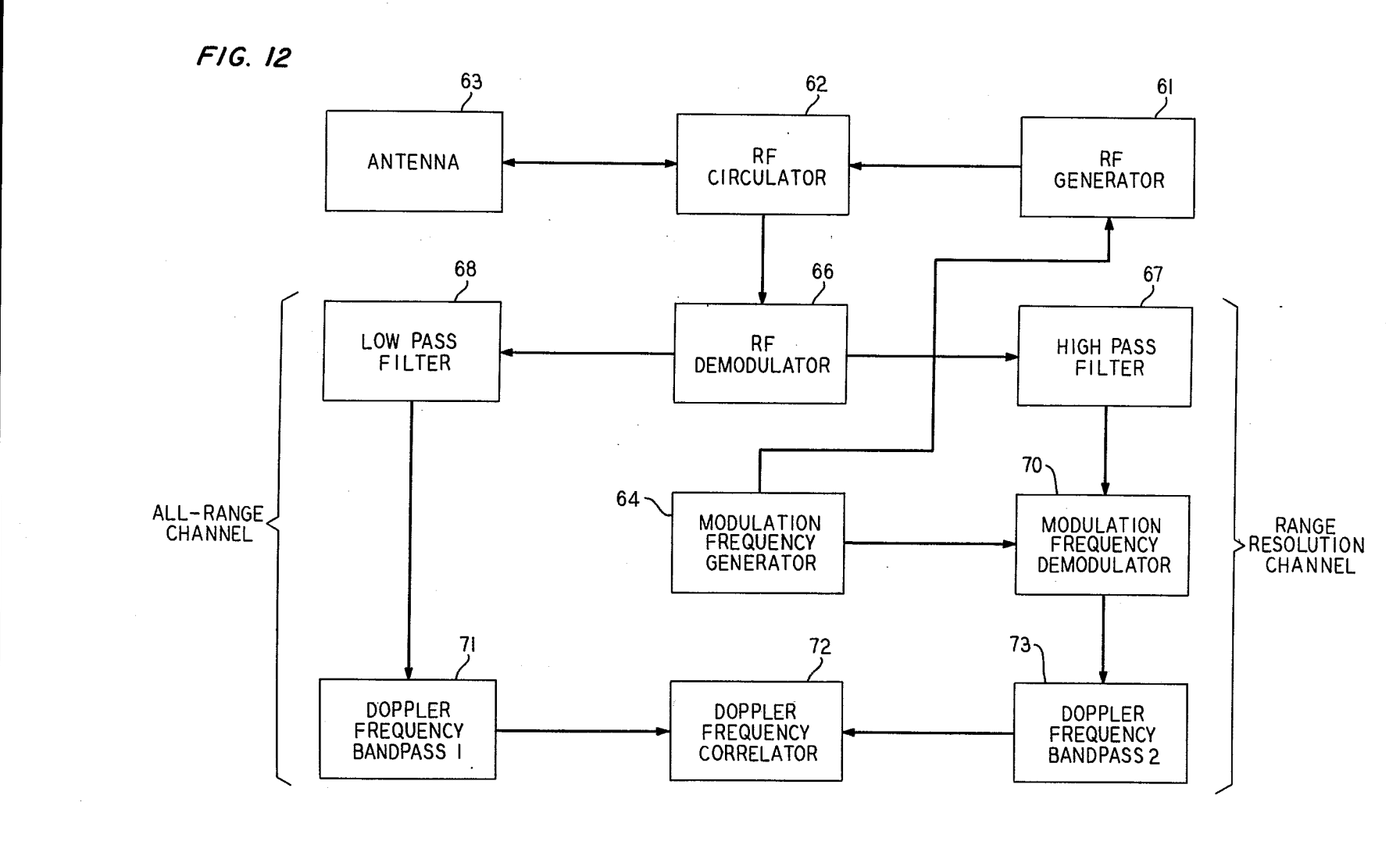
FIG. 12 is a block schematic diagram of an illustrative radar system employing both shaped and single-sideband modulation, according to the invention.

FIG. 12 shows a simplified block diagram for such a radar system. It combines several of the previously discussed topics, namely the cosine pulse generation by means of two component signals and the single-sideband principle for spectrum conservation.

As shown, the output of an RF generator 61 is connected to an RF circulator 62, then to an antenna 63. The output of a modulation generator 64 is connected to RF generator 61 to frequency modulate the same.

RF circular 62 is also connected to an RF demodulator 66 thence to a high-pass filter 67 and a low-pass filter 68. The output of high-pass filter 67 is connected to a frequency demodulator 70 which also receives an input signal from generator 64.

The output of low-pass filter 68 is connected, via a doppler bandpass filter 71, to a doppler correlator 72. In like fashion, the output of frequency demodulator 70 is connected, via a doppler bandpass filter 73, to correlator 72.

Figure 13:
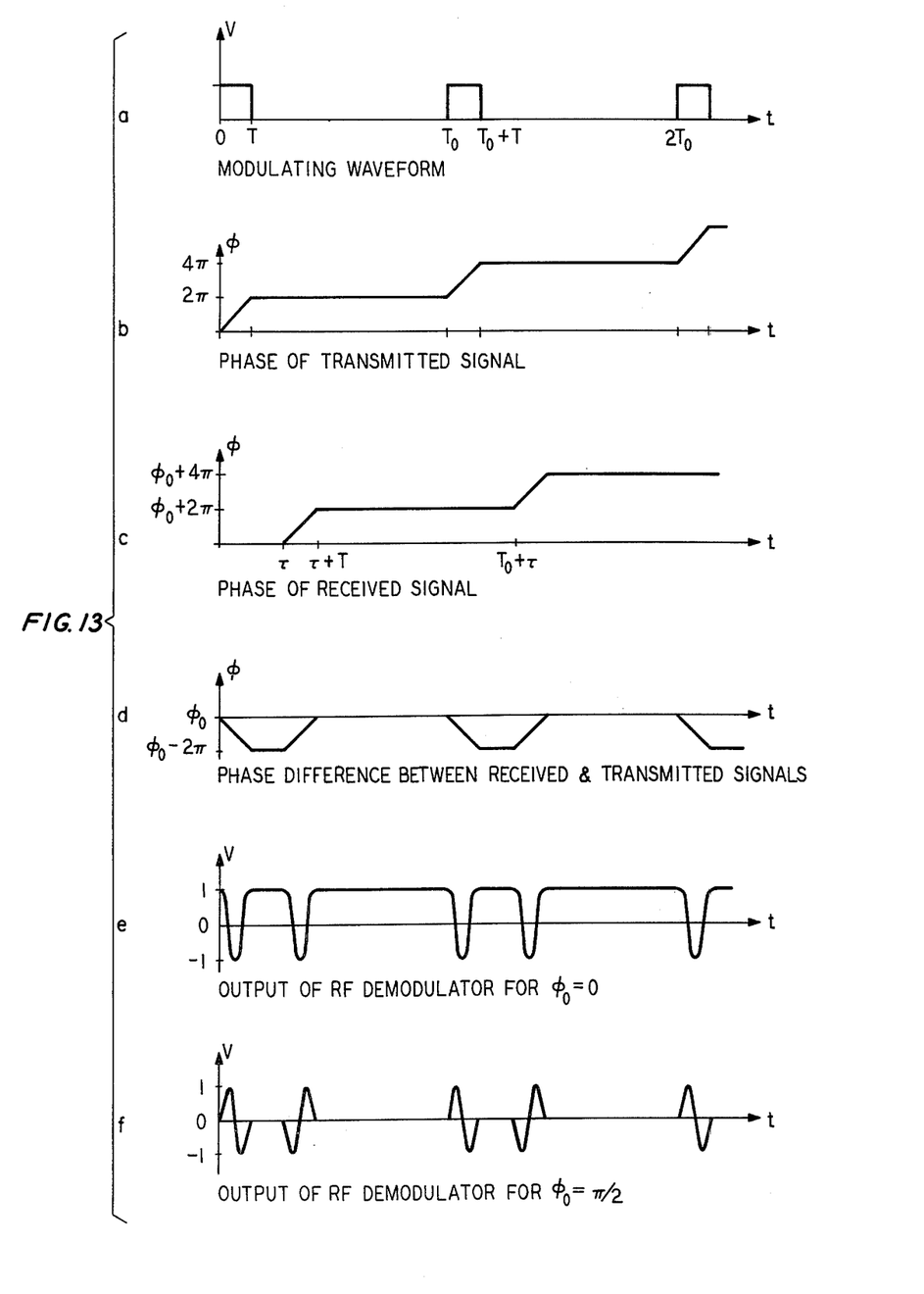
FIG. 13 is a graph depicting various waveforms found in the circuit of FIG. 12.

In operation, the modulation waveform generated by generator 64 is an ordinary pulse train. The RF generator 61 proudes a CW signal which is frequency modulated by linearly shifting its phase through $2\pi$ radians during the pulse period (see FIGS. 13a and 13b). The resulting signal has two noteworthy properties: Its spectrum has the sidelobe behavior of that for the cosine pulse and it is located asymmetrically (skewed) with respect to the carrier.

The signal described by FIG. 13b may be thought of as being composed of the following three signals: The continuous carrier $w_c$; the negative of the carrier multiplied by the gating function $S(t)$; the modified carrier $w_c + w_a$ during the pulse interval. The composite signal $f(t)$ may therefore be written as:

$$f(t) = \cos w_c t - S(t)\cos w_c t - S(t)\cos(w_c + w_a)t \quad (18)$$

The sign of the last term is minus due to the fact that at $t = 0$ this signal is exactly of opposite phase in relation to the unshifted carrier. When compared to FIG. 1e, this signal differs by the presence of the CW component and the phasing at $t = 0$. The resulting spectrum is composed of the cosine-pulse spectrum, skewed with respect to the carrier, centered at $w = w_c + w_a/2$, with a strong component at $w = w_c$. It has, therefore, some of the characteristics of a single-sideband spectrum.

Upon reception the signal is demodulated by mixing with the carrier $w_c$. FIGS. 13b, 13c and 13d show the phase relationship between transmitted and received signals. FIGS. 13e and 13f illustrate two possible demodulation results depending on the Doppler phase shift $\phi_o$ incurred by the echo signal. The combination of these signals results in an effective pulse train, as shown in FIG. 13a.

After demodulation (FIG. 12) the signal is separated into two channels, an all-range channel without range indication and a range resolution channel. In the all-range channel, target signals from all ranges are extracted by doppler bandpass filtering. In the range resolution channel the modulation waveform is extracted by range gating (Modulating Frequency Demodulator) and bandpass filtered to obtain target doppler information from one discrete range cell. The correlator output combines the features of both channels, providing range resolution and doppler information as well as sensitivity for weak targets.

To implement the shaped-spectrum scheme for CW radar, illustrated by FIG. 13 illustrative embodiments were built employing a signal linearly phase shifted through $\pi$ radians in accordance with a pseudo-random code modulating function. The resulting spectrum exhibited the shape associated with the cosine pulse, similar to that given in FIG. 6. A spectrum analyzer was used to display one using a 7-element code. Although these spectra were found to be relatively coarse, due to this very short code, the significant features were apparent. These were the sidelobe envelope shape of the spectrum and its skewed position with respect to the carrier. The latter characteristic was exemplified by reversing the polarity of the code, thereby reversing the asymmetry of the spectrum. The two signals displayed differed in this manner. Other radar systems were built employing the same principles but using code lengths of both 15 and more elements.

While these coded radars realized the spectral saving associated with pulse shaping only, a pulse frequency modulated radar was built which achieved the vestigial sideband approximation described. This radar was modulated in accordance with a rectangular pulse train (without code) whereby the frequency was shifted during the pulse period so as to advance the phase by $2\pi$ radians during the interval. The radar system used the dual channel processing of carrier and sideband signals with correlation of both outputs. A more recent radar employs the same technique but uses a shift of $\pi$ only. This results in a symmetric spectrum but achieves good sidelobe behavior with concentration of the signal power near the center of the spectrum.

It will be appreciated that instead of using a pulse modulated RF carrier one could also employ a pseudo-random code modulator carrier together with an unmodulated carrier.

Although the techniques above have been treated from the radar standpoint, many apply to communications systems as well.

One skilled in the art may make various substitutions and changes to the arrangement of parts shown without departing from the spirit and scope of the invention.

What is claimed is:

1. A pulsed radar system of the type wherein a beam of microwave energy interrogates a target, said target generating a return echo which is received by the interrogating antenna means for subsequent signal processing, comprising:
   means for shaping the pulses comprising said beam so that the envelope of each pulse assumes a $\cos^n$ shape, $n$ being equal to or greater than one, said shaping means including
   means for generating a microwave carrier signal,
   means for generating a train of pulses, each pulse having a width $w$,
   a modulation frequency generator for shaping the waveform of said pulses of said pulse train,
   a radio frequency multiplier for multiplying the output of said carrier generating means with the output of said modulation frequency generator to provide rf multiplier output frequencies spaced with respect to one another by $1/w$,
   switching means interposed between the output of said multiplier and said antenna means and operated in response to said pulse train, and
   delay means for adjusting the output of said pulse generating means to insure that said switching means turns on and off when $\cos^n = 0$.

2. The radar system according to claim 1 wherein $n = 1$ and said modulation frequency generator converts the output of said pulse generating means into a sinusoidal waveform and wherein the output of said radio frequency multiplier is connected directly to said switching means.

3. The radar system of claim 1 except that $n$ is any odd integer and wherein said modulation frequency generator operates on the output of said pulse generating means to generate harmonics of the pulse repetition rate of said pulse generating means;
   $n+1$ filtering circuits in the output of said radio frequency multiplier, each comprising a bandpass filter and a weighting network, for filtering out alternative multiplier output frequencies; and
   means coupled to said switching means for summing the weighted outputs of said $n+1$ filtering circuits.

4. The radar system of claim 3 except that $n$ is any even integer and wherein said $n+1$ filtering circuits in the output of said frequency multiplier filters out consecutive multiplier output frequencies.

* * * * *